Jan. 27, 1959   H. H. PAYZANT   2,870,807
WOODWORKING FINGER JOINT CUTTER ASSEMBLY
Filed Oct. 4, 1957   3 Sheets-Sheet 3

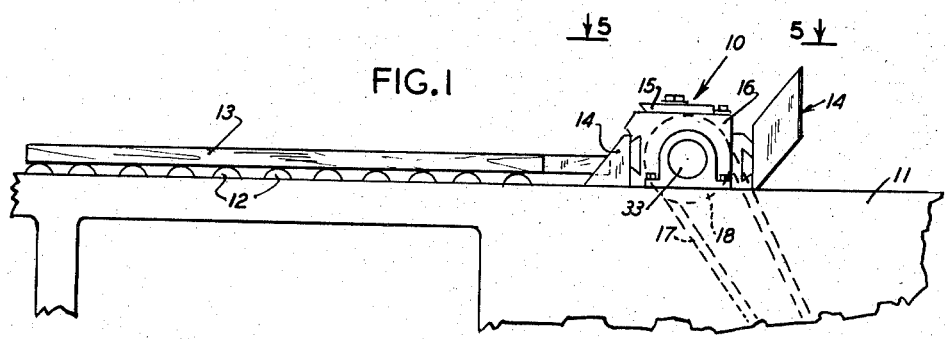
FIG. 1
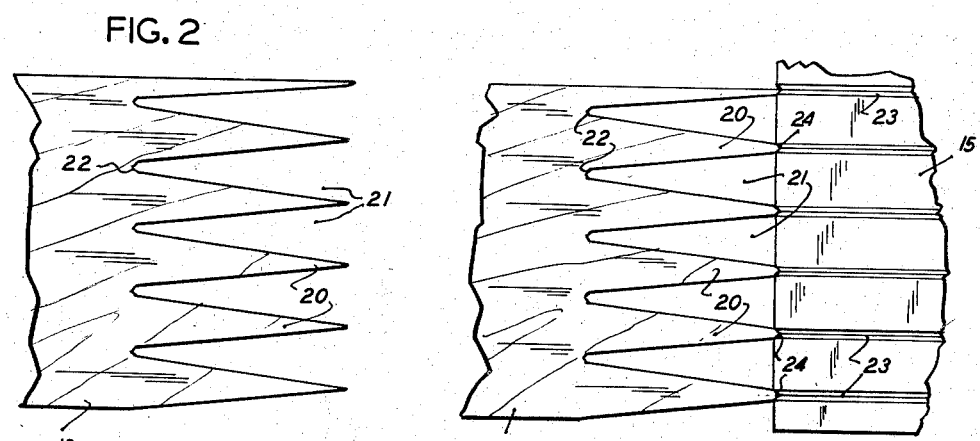
FIG. 2
FIG. 3
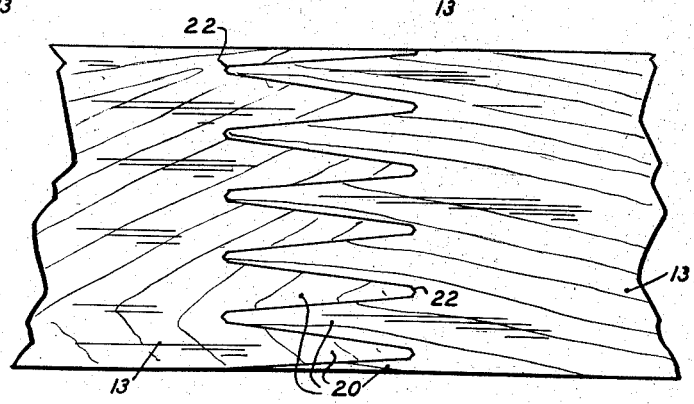
FIG. 4

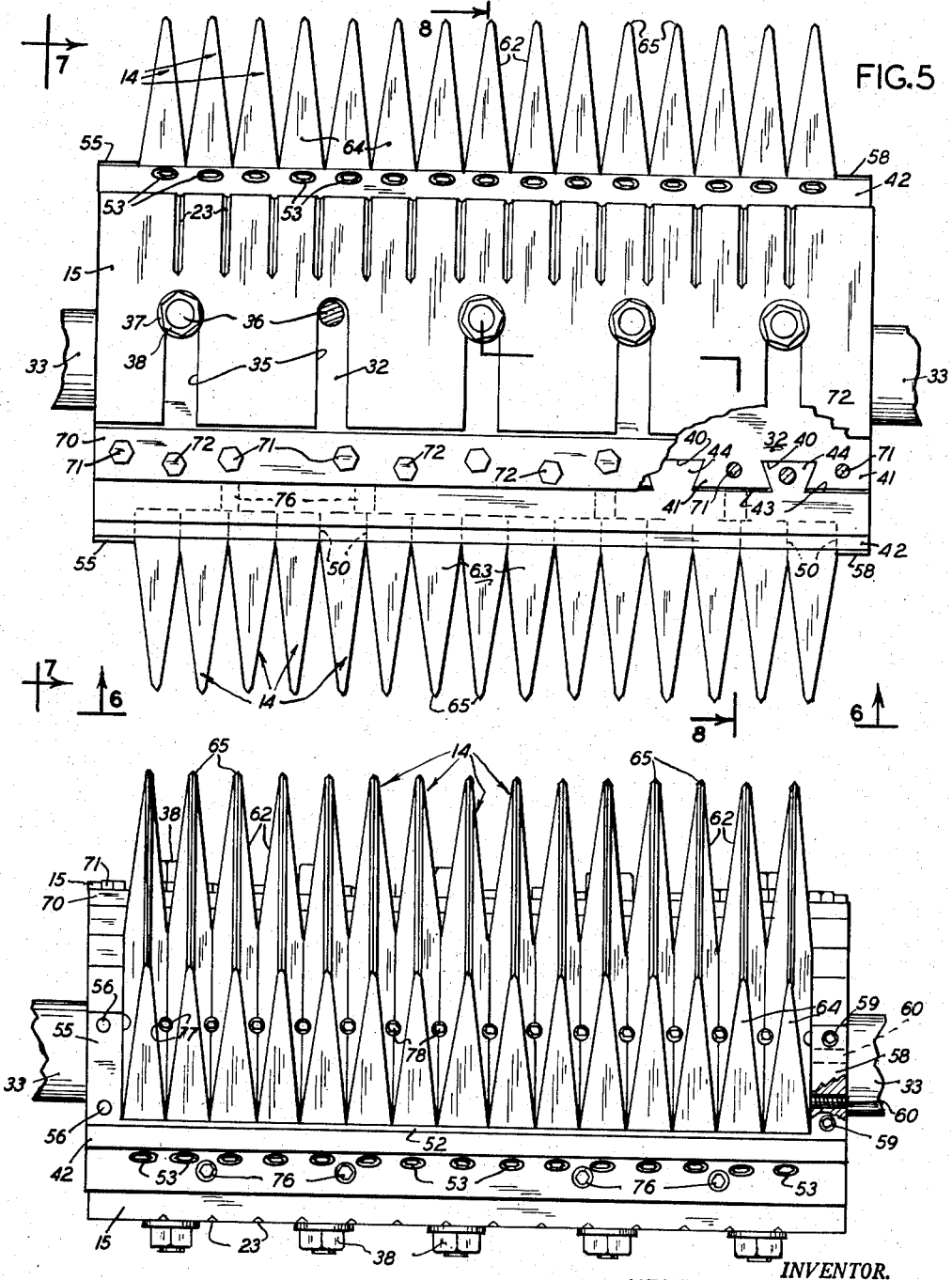

INVENTOR.
HENRY H. PAYZANT
BY
BUCKHORN, CHEATHAM & BLORE
ATTORNEYS

United States Patent Office 2,870,807
Patented Jan. 27, 1959

2,870,807

WOODWORKING FINGER JOINT CUTTER ASSEMBLY

Henry Harris Payzant, Portland, Oreg., assignor to Timber Structures, Inc., Portland, Oreg., a corporation of Oregon Application October 4, 1957, Serial No. 688,336

3 Claims. (Cl. 144—218)

My present invention comprises a finger joint cutter for producing finger joint ends on boards which are to be glued together in end-to-end alignment. Finger joints are highly desirable since they provide a large gluing surface without possibility of variations in thickness as in scarved joints, but heretofore their use has been limited since no cutter head of the prior art could produce accurately dimensioned fingers, and for the further reason that, even though a passably dimensioned joint could be formed by a cutter head, sharpening of the blades involved tedious and lengthy adjustments. The drawbacks of the prior art cutter heads include the fact that each cutter blade had to be mounted separately with lateral and longitudinal adjustment screws or bolts, requiring wide separation of one blade from another with the result that blades had to be staggered on opposite faces of the arbor block. In other words, the mounting for each blade was so cumbersome due to the necessity for individual blade adjustment after each sharpening that cutter blades for cutting alternate finger notches had to be mounted on opposite faces of the cutter block. This caused the finger tips to be inaccurately formed and often to be broken since one set of blades would force the finger tips in one direction transversely of the board while the opposite set of cutter blades would tend to force them back in the opposite direction. Since the wood would not spring back and forth as rapidly as the blades rotating at high speeds struck alternate shaving blows, the result was inaccuracy and excessive spoilage.

The principal object of the present invention is to provide a finger joint cutter in which each of a pair of opposed cutter blade assemblies cuts each finger notch at each cutting blow whereby accurately dimensioned, unbroken finger joints are always formed.

A further object of the present invention is to provide a finger joint cutter in which the operation of sharpening the blades may be rapidly carried out, and reassembly of the blades on the arbor may be accomplished rapidly and accurately. In accordance with the present invention the blades may be sharpened many times and the cutter head reassembled and quickly adjusted to provide finger joints of exact dimensions.

The foregoing and other objects and advantages of the present invention will be more readily ascertained from inspection of the accompanying drawings taken in connection with the following specification wherein like numerals refer to like parts throughout.

In the drawings,

Fig. 1 is a side elevation of a finger joint cutter mounted on a roll table for supporting a board;

Fig. 2 is a plan view of a board having a finger joint end cut therein, prior to trimming of the tips of the fingers by the finger joint cutter;

Fig. 3 shows the tip blade in the operation of trimming the tips of the fingers;

Fig. 4 is a plan view of a board produced by gluing together a pair of board ends formed in accordance with the present invention;

Fig. 5 is a plan view, partly broken away, of the cutter taken from the plane 5—5 of Fig. 1;

Fig. 6 is a view in elevation, partly broken away, taken from the plane 6—6 of Fig. 5;

Figure 8:
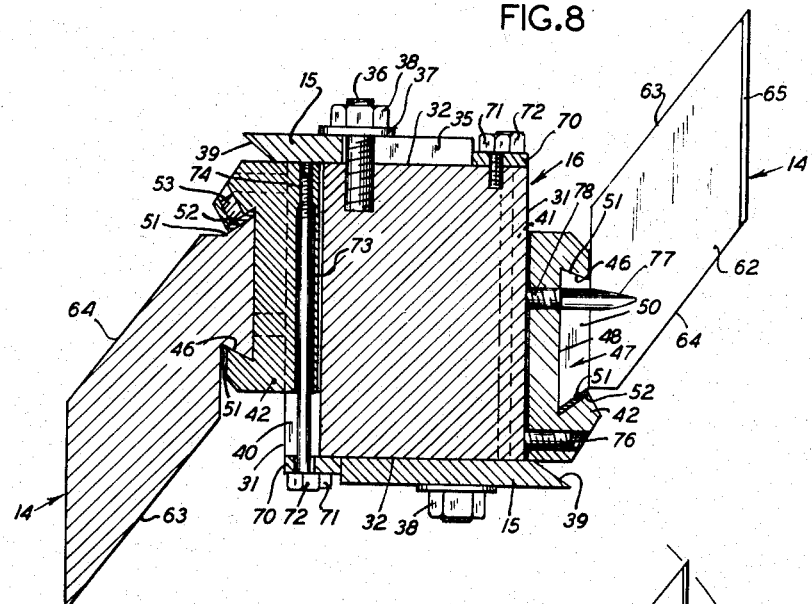
Fig. 8 is a vertical section taken substantially along the line 8—8 of Fig. 5.

In the drawings the cutter is indicated generally by the numeral 10. A conventional cutting machine is indicated by the frame 11 provided with rolls 12 upon which a board 13 may be positioned and directed into engagement with the blades 14 for cutting the fingers and blades 15 for trimming the tips of the fingers which comprise a portion of the cutter assembly. The blades are mounted upon an arbor 16 driven in any suitable manner such as by means of a belt 17 and pulley 18, the belt being connected to a suitable source of power (not shown). The cutter blades 14 are preferably so shaped as to provide long, tapering fingers 20 separated by acute angle notches 21, the bottom of the notches being blunted as indicated at 22. The cutter blades 15 (there being a pair of such blades, one on each of a pair of diametrically opposed parallel surfaces of the arbor 16) are provided with grooved cutting areas 23 which trim the points of the fingers 21 to blunt points indicated at 24 which match the blunt bottoms 22 of the notches. A pair of boards 13 having their ends shaped by the cutter may be joined together by adhesive placed on the side surfaces of the fingers 20 to form a long board having accurate dimensions, as distinguished from a board formed by means of a scarved joint in which it is usually necessary to plane or sand the feathered edges of the joint which protrude above the planes of the surfaces of the board. The fingers 20 and notches 21 provide a large gluing surface whereby a strong joint is formed. The arbor 16 is conveniently formed so as to have a rectangular cross-section providing a pair of diametrically opposed, parallel surfaces 31 upon which the finger cutters 14 are mounted and a pair of diametrically opposed, parallel surfaces 32 upon which the tip cutters 15 are mounted. The arbor 16 is provided with longitudinally projecting trunnions 33 for mounting the cutter in bearings and for attaching the driving pulley.

Each of the tip cutters 15 comprises a long, flat blade having transverse slots 35 extending inwardly from one edge through which studs 36 project from the face 32, the cutter blades being held in adjusted position by washers 37 and nuts 38 on the studs. The forward edge of each blade 15 comprises an acutely angled surface 39 which may be ground to sharpen the cutter portions. The actual cutter portions are in the shape of 90° grooves 23 which intersect the surface 39. It can be realized that the surface 39 may be ground away to a large extent without impairing the blade, the blade merely being adjusted forward at each sharpening so that the forward edge is at the proper radial distance from the axis of the arbor. Since the resistance to the blades 15 is very slight, and the radial distance of the blade from the axis of rotation is small, there is no need for complicated backing screws, the nuts 36 and washers 37 being sufficient.

The opposed faces 31 comprise alternate, dove-tailed slots 40 and ribs 41 which extend transversely of the arbor from side to side, being very simple to machine. A pair of blade holders 42 which extend from end to end of the arbor are respectively mounted upon the faces 31, each blade holder having alternate dove-tailed slots 43 and ribs 44 which fit into and engage the slots 40 and ribs 41 on the arbor. The blade holders 42 are transversely much narrower than the faces 31 of the arbor so that a wide range of transverse adjustment of the blade holder across the face of the arbor is provided.

Each blade holder is provided with a longitudinally extending, undercut slot 46 which extends from end to end of the blade holder and hence is easily machined. The finger blades 14 are mounted upon the blade holder to form therewith a unitary assembly as follows: Each blade 14 comprises a base portion 47 which is engaged in the slot 46, each base portion comprising a bottom 48 which engages the bottom of the slot, parallel, vertical, side walls 50 and undercut end walls 51 which engage in the undercut slot. The blades are mounted side-by-side in the slot with the vertical side walls 50 of adjacent blades contiguous. A gib 52 is provided between one side wall of the undercut slot and the end walls 51 along one surface of the blade assembly, which gib is engaged by recessed-head set screws 53 extending through the blade holder 42, preferably one such set screw being provided opposite each blade whereby the blades are transversely, firmly locked into the slot. The base portions of the blades are accurately machined so that exact alignment is achieved. One end of the slot is blocked by a buttress block 55 which is retained by taper pins 56 driven through taper holes in the buttress block into corresponding taper holes in the blade holder. The buttress block 55 is accurately machined to have its inner surface lying at 90° to the longitudinal axis of the slot so that the pack of blades is backed against an accurately positioned buttress block. The pack is retained by a clamp block 58 disposed in the other end of the slot and held in position by a pair of recessed-head bolts 59 passing through the block and into the blade holder. A pair of recessed-head set screws 60 extend longitudinally through the clamp block and are tightened firmly to retain the pack of blades in the slot.

Each finger blade 14 comprises acutely angled side walls 62 which match the angularity of the notches to be formed in the board. Each blade terminates forwardly in a cutting face 63 which is acutely raked forward, and the trailing face 64 of each blade is correspondingly raked forward. The side faces 62 terminate along lines parallel to the faces 31 of the arbor in obtusely angled surfaces 65 corresponding to the blunted bottoms 22 of the slots 21.

Figure 7:
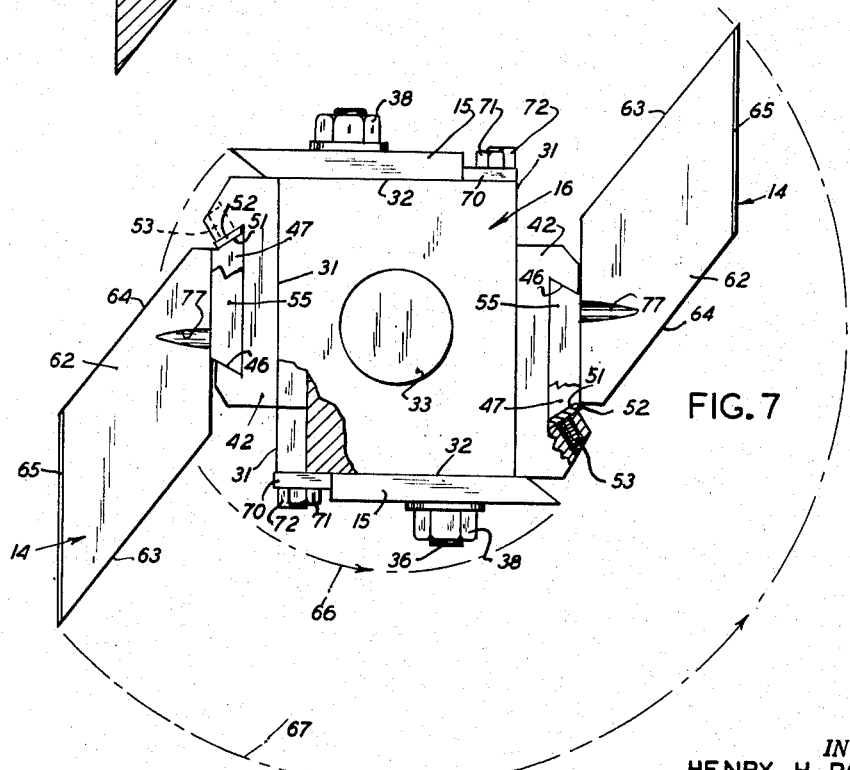
Fig. 7 is an end view, partly broken away, taken from the plane 7—7 of Fig. 5.

From the foregoing it may be seen that the blade holders 42 may be removed from the arbor and the entire group ground away parallel to the faces 63 numerous times to sharpen the blades without in any way affecting the dimensions of the fingers produced in the board. All that is required to produce a proper finger joint end on a board is to adjust the blades 15 forwardly after each sharpening operation to bring the cutting edge thereof back to the proper cutting circle indicated at 66 on Fig. 7, and adjust the blade holders 42 forwardly to bring the tips of the cutting faces 63 back to the proper cutting circle 67 indicated on Fig. 7. A simple gauge may be provided for this purpose which indicates the radii from the axis of the trunnions 33.

Since the finger cutters 14 encounter heavy resistance and are at a large radius from the axis of the arbor, means are provided firmly to retain the blade holders 42 in adjusted position as follows: A tension-bolt bearing-bar 70 is mounted on the trailing edge of each surface 32 of the arbor, behind the rear edges of the tip cutters 15, by means of a plurality of bolts 71 passing through the bar and into the arbor. A plurality of long tension-bolts 72 extend through openings in the bar 70 and extend longitudinally through respective dove-tailed slots 40 in the arbor. Each blade holder 42 is provided with corresponding transverse bores 73 which are threaded for engagement with the bolts 72 only at the rear extremity for a short distance as indicated at 74 in Fig. 8. Tightening of the bolts 72 therefore moves the blade holders 42 transversely forward in the direction of rotation, holding the blade holders with the bolts in tension against the working thrust.

A plurality of recessed-head, compression set screws 76 are threaded through the trailing edge of the holder 42 and thrust against the rear ends of the ribs 41 on the arbor. The vertical faces 50 of the bases of each blade 14 and adjacent portions of the side walls 62 thereof are provided with vertical grooves 77 through which may be passed a plurality of recessed-head, compression screws 78 threaded through the blade holder 42 and bearing against the forward ends of the ribs 41 on the arbor. The set screws 76 and 78 are firmly tightened against the outer surface of the ribs 41 to draw the dove-tail ribs 44 into the dove-tail slots 40, thereby firmly locking the holder by a plurality of front and rear compression screw members thrusting normal to the faces 31 of the arbor and preventing the holder from canting or slipping from its adjusted position. When the blades 14 are to be sharpened all of the set screws 76 and 78 are first loosened, then the bolts 71 are disengaged to permit transverse withdrawal of the bearing bar 70 and of the entire cutter assembly and holder as a unit. After the blades are sharpened they are slid back into position, the bolts 71 re-engaged to firmly hold the bearing bar 70 in position and the bolts 72 rotated adjustably to move the cutter assembly forward to compensate for the amount of the blades removed by sharpening. When the adjusted position is reached the screws 76 and 78 are all tightened firmly to hold the assembly in adjusted position.

From the foregoing it can be seen that each finger is formed by blades operating simultaneously on the opposite, vertical faces thereof. Each set of blades 14 successively shaves a small increment from the vertical surfaces of each finger. As a result, none of the fingers are vibrated laterally as in prior art practices, and all fingers are formed perfectly to exact dimensions.

Having illustrated and described a preferred embodiment of the present invention, it should be apparent to those skilled in the art that the same permits of modification in detail and arrangement. I claim as my invention all such modifications as come within the true spirit and scope of the appended claims.

I claim:

1. A finger joint cutter comprising an arbor having transverse, dove-tail slots and ribs on a pair of diametrically opposed faces, a pair of blade holders respectively mounted on said opposed faces, said blade holders having dove-tail slots and ribs interlocking with the dove-tail slots and ribs on the arbor, said blade holders being transversely narrower than said opposed faces and each having a longitudinal, undercut slot in its outer surface, a plurality of blades mounted on each of said blade holders, each of said blades comprising a base portion having a flat bottom, parallel, vertical side walls and undercut end walls for engagement in said undercut slot, said blades being mounted side-by-side with the side walls of the base portions of adjacent blades contiguously, means locking said blades in fixed position in said slots on said blade holders, a plurality of tension bolts extending longitudinally of respective dove-tail slots in the arbor and into threaded engagement with corresponding dove-tail ribs on the blade holders, means providing bearing surfaces for the heads of said tension bolts where said bolts may be rotated to adjust said blade holders transversely of said arbor, and a plurality of compression screws threadedly engaged in and extending through said blade holders normal to said opposed faces, said compression screws thrusting against said opposed faces to lock said blade holders in adjusted position on said arbor.

2. A finger joint cutter comprising an arbor having transverse, dove-tail slots and ribs on a pair of diametrically opposed faces, a pair of blade holders respectively mounted on said opposed faces, said blade holders having dove-tail slots and ribs interlocking with the dove-tail slots and ribs on the arbor, said blade holders being transversely narrower than said opposed faces and each having a longitudinal, undercut slot in its outer face, a plurality of blades mounted on each of said blade holders, each of said blades comprising a base portion having a flat bottom, parallel, vertical side walls and undercut end walls for engagement in said undercut slot, said blades being mounted side-by-side with the side walls of the base portions of adjacent blades contiguously, means locking said blades in fixed position in said slots on said blade holders, a plurality of tension bolts extending longitudinally of the dove-tail slots in the arbor and into threaded engagement with corresponding dove-tail ribs on the blade holders, a pair of bearing bars, each removably mounted forwardly of the respective blade holders, the heads of said tension bolts bearing against their said bearing bar in the forward direction, whereby said bolts may be rotated to adjust said blade holders transversely forwardly on said arbor, and a plurality of compression screws threadedly engaged in and extending through said blade holders normal to said opposed faces, said compression screws thrusting against the surfaces of ribs in said opposed faces to lock said blade holders in adjusted position.

3. A finger joint cutter comprising an arbor having transverse, dove-tail slots and ribs on a pair of diametrically opposed faces, a pair of blade holders respectively mounted on said opposed faces, said blade holders having dove-tail slots and ribs interlocking with the dove-tail slots and ribs on the arbor, said blade holders being transversely narrower than said opposed faces and each having a longitudinal, undercut slot in its outer face, a plurality of blades mounted on each of said blade holders, each of said blades comprising a base portion having a flat bottom, parallel, vertical side walls and undercut end walls for engagement in said undercut slot, said blades being mounted side-by-side with the side walls of the base portions of adjacent blades contiguously, means locking said blades in fixed position in said slots on said blade holders, a plurality of tension bolts extending longitudinally of the dove-tail slots in the arbor and into threaded engagement with corresponding dove-tail ribs on the blade holders, a pair of bearing bars, each removably mounted forwardly of the respective blade holders, the heads of said tension bolts bearing against their said bearing bar in the forward direction, whereby said bolts may be rotated to adjust said blade holders transversely forwardly on said arbor, a plurality of compression screws threadedly engaged in and extending through said blade holders normal to said opposed faces, said compression screws thrusting against the front and rear ends of the surfaces of ribs in said opposed faces to lock said blade holders in adjusted position, each of said cutter blades comprising side walls extending from said base portion at acute angles to each other, and forward, flat cutting surfaces acutely raked forward, said cutting surfaces all lying in a common plane whereby all of said blades may be uniformly sharpened by simultaneously grinding all of said cutting faces.

References Cited in the file of this patent

UNITED STATES PATENTS 362,625  Hewit  May 10, 1887